(12) United States Patent
Yamasaki et al.

(10) Patent No.: US 9,174,195 B2
(45) Date of Patent: Nov. 3, 2015

(54) ADSORBENT FOR CANISTER, AND CANISTER

(75) Inventors: Koji Yamasaki, Saitama (JP); Mitsunori Hitomi, Okayama (JP); Takashi Nagamine, Marugame (JP)

(73) Assignees: MAHLE FILTER SYSTEMS JAPAN CORPORATION, Tokyo (JP); KURARAY CHEMICAL CO., LTD., Bizen-shi (JP)

( * ) Notice: Subject to any disclaimer, the term of this patent is extended or adjusted under 35 U.S.C. 154(b) by 131 days.

(21) Appl. No.: 14/128,249

(22) PCT Filed: May 29, 2012

(86) PCT No.: PCT/JP2012/063706
§ 371 (c)(1),
(2), (4) Date: Dec. 20, 2013

(87) PCT Pub. No.: WO2013/001963
PCT Pub. Date: Jan. 3, 2013

(65) Prior Publication Data
US 2014/0124385 A1    May 8, 2014

(30) Foreign Application Priority Data

Jun. 30, 2011   (JP) .................................. 2011-145237

(51) Int. Cl.
*F02M 25/08* (2006.01)
*B01J 20/28* (2006.01)
(Continued)

(52) U.S. Cl.
CPC ............ *B01J 20/28085* (2013.01); *B01J 20/20* (2013.01); *B01J 20/2803* (2013.01);
(Continued)

(58) Field of Classification Search
CPC .. B01J 20/20; B01J 20/2819; B01J 20/28042; B01J 20/28085; B01J 20/3064; B01J 20/2803; B01J 20/28021; B01J 20/28083; B01J 20/28092; F02M 25/08; B01D 53/04; B01D 2253/102; B01D 2253/308; B01D 2253/34; B01D 2257/702

USPC ............... 96/131, 132, 147; 95/146; 123/519; 502/416

See application file for complete search history.

(56) References Cited

U.S. PATENT DOCUMENTS 6,540,815 B1 *   4/2003   Hiltzik et al. ................... 95/146
6,695,896 B2    2/2004   Hara et al.
(Continued)

FOREIGN PATENT DOCUMENTS

| JP | 2002-266709 | A |   | 9/2002 |
|----|-------------|---|---|--------|
| JP | 2005-325708 | A |   | 11/2005 |
| JP | 2009-19572  | A |   | 1/2009 |
| JP | 2009-191688 | A |   | 8/2009 |
| JP | 2011-132903 | A | * | 7/2011 |

*Primary Examiner* — Frank Lawrence
(74) *Attorney, Agent, or Firm* — Foley & Lardner LLP

(57) ABSTRACT

To obtain adsorbent (10), meltable core which melts away during baking and binder are added to powdery activated carbon having microscopic pore whose size is less than 100 nm together with water and mixed together, then this mixture is molded into hollow cylindrical shape whose outside diameter is 4~6 mm and baked. Although macroscopic pore whose side is 100 nm or more is formed by the meltable core, proportion of volume of the macroscopic pore to volume of the microscopic pore is adjusted to 65%~150%. The adsorbent (10) has shape in cross section formed from cylindrical wall (10A) and cross-shaped radial wall (10B), and thickness of each part is within a range of 0.6~3 mm. The adsorbent (10) of the present invention can satisfy adsorbing/desorbing performance of fuel vapor, flow resistance as a canister and strength of the adsorbent at the same time.

10 Claims, 6 Drawing Sheets

(51) Int. Cl.
*B01J 20/20* (2006.01)
*B01J 20/30* (2006.01)

(52) U.S. Cl.
CPC ...... *B01J 20/28019* (2013.01); *B01J 20/28021* (2013.01); *B01J 20/28042* (2013.01); *B01J 20/28092* (2013.01); *B01J 20/3064* (2013.01); *F02M 25/08* (2013.01); *B01D 2253/308* (2013.01); *B01D 2253/34* (2013.01)

(56) References Cited

U.S. PATENT DOCUMENTS

| | | | |
|---|---|---|---|
| 8,015,965 B2 | 9/2011 | Yamasaki | |
| 8,360,034 B2 | 1/2013 | Yamasaki | |
| 8,443,786 B2 | 5/2013 | Yamasaki | |
| 2006/0288872 A1* | 12/2006 | Nakano | 96/108 |
| 2013/0269521 A1* | 10/2013 | Nishita et al. | 95/91 |

* cited by examiner

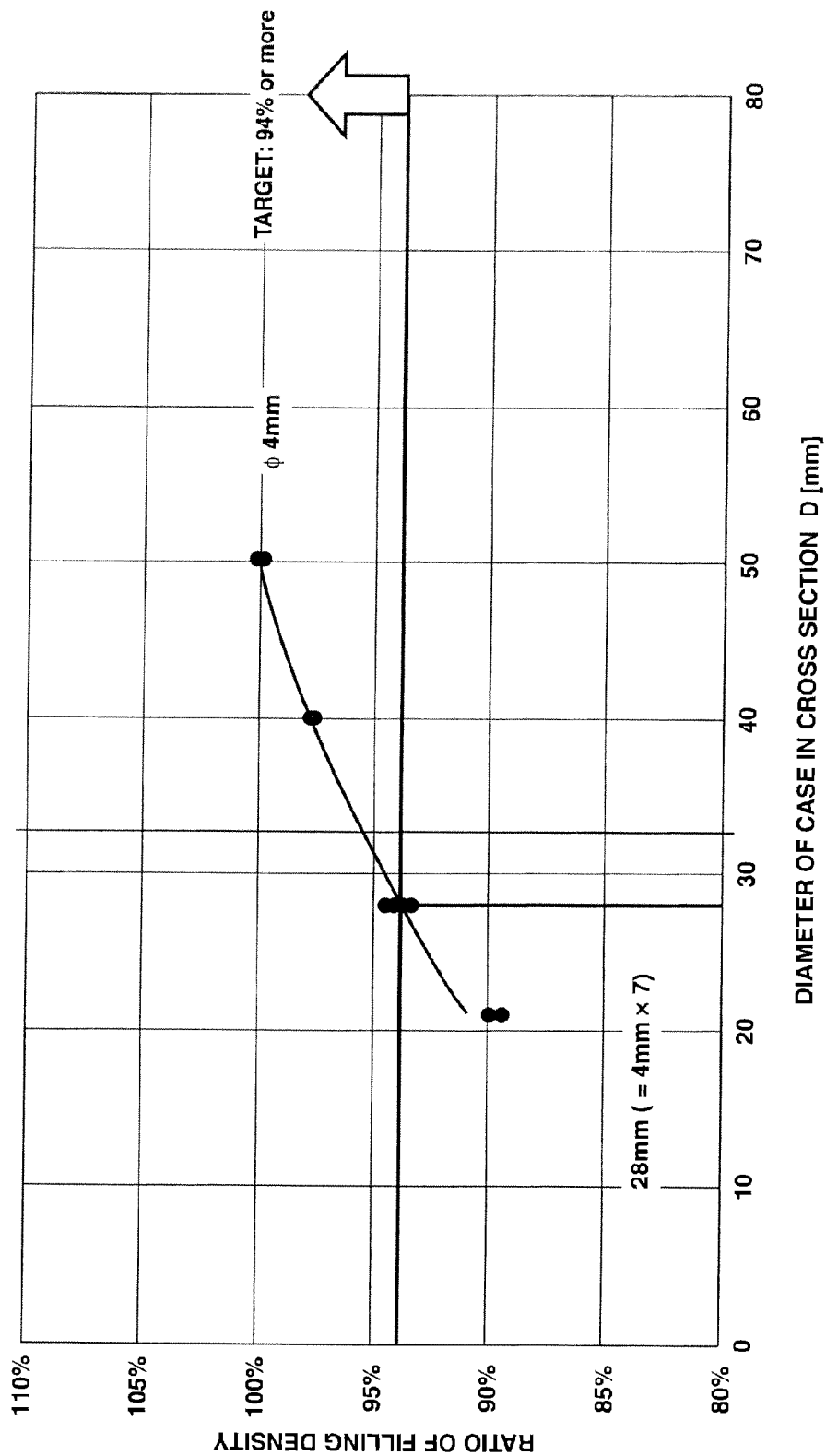

ADSORBENT FOR CANISTER, AND CANISTER

TECHNICAL FIELD

The present invention relates to a canister using activated carbon and its adsorbent, used for, for instance, a treatment of fuel vapor of an internal combustion engine for a vehicle.

BACKGROUND ART

For instance, for an internal combustion engine of a vehicle, in order to prevent release of fuel vapor evaporated from a fuel tank of the vehicle into the outside, a canister that is capable of adsorbing and desorbing the fuel vapor is provided. The canister temporarily adsorbs the fuel vapor that is generated after a vehicle stop etc., and desorbs an adsorbed fuel component together with a fresh atmospheric air during a drive then burns the fuel component in the internal combustion engine.

Here, as an adsorbent of the canister, although activated carbon having minute pore that catches the fuel component is widely used, Patent Document 1 has proposed a technique of, as a so-called molded activated carbon adsorbent obtained by molding activated carbon powder into a granular shape or a particle through a binder, forming macroscopic pore that is greater in size than microscopic pore of the activated carbon itself, by adding meltable core that sublimates or decomposes at a baking to the activated carbon powder together with the binder then molding and baking this mixture. A size of the microscopic pore of the activated carbon itself is less than 100 nm, while a size of the macroscopic pore formed by the meltable core is 100 nm or greater. The macroscopic pore functions as a sort of path through which a molecule(s) of the evaporated fuel can pass. By forming the macroscopic pore that serves as the path at an inside of the adsorbent in this manner, it is possible to increase a size of the adsorbent while ensuring an adsorbing/desorbing performance.

In view of a flow resistance which is important as the canister, it is desirable that the granular adsorbent should have a measure of size, e.g. a particle diameter of about 4 mm that is disclosed in the Patent Document 1. However, in the case of such large-sized adsorbent, a part of activated carbon component, which exists at the inside of each adsorbent, does not contribute to the adsorption/desorption of the evaporated fuel, and thus the adsorbing/desorbing performance of the large-sized adsorbent becomes low as compared with minute adsorbent. Therefore, in the case of adsorbent having the large-sized particle diameter disclosed in the Patent Document 1, in order to ensure the adsorbing/desorbing performance, a proportion of the macroscopic pore to the microscopic pore is quite high. As a consequence, this case has such defects that strength of the adsorbent is low.

That is to say, the canister using the related art adsorbent can not satisfy the adsorbing/desorbing performance of the fuel vapor, the flow resistance as the canister and the strength of the adsorbent at the same time.

CITATION LIST

Patent Document

Patent Document 1: Japanese Patent Provisional Publication Tokkai No. 2009-019572

SUMMARY OF THE INVENTION

Adsorbent for a canister according to the present invention, which forms macroscopic pore whose size is 100 nm or more by adding meltable core, which melts away during baking, to powdery activated carbon having microscopic pore whose size is less than 100 nm together with a binder and baking this mixture, comprises: a hollow shape having, as an outside shape, a cylindrical shape whose outside diameter is 4 mm 6 mm or a spherical shape whose diameter is 4 mm~6 mm, also having a thickness of 0.6 mm~3 mm at each part. And a proportion of a volume of the macroscopic pore to a volume of the microscopic pore in the adsorbent is set to 65%~150%.

As a desirable example, the adsorbent has a hollow shape in cross section, which is formed from a cylindrical wall at an outer side and a radial wall provided in a middle inside the cylindrical wall, and a thickness of each part of the cylindrical wall and the radial wall is within a range of 0.6 mm~3 mm.

Regarding the adsorbent of the present invention, a size of its outside shape is relatively large. Thus, when filling an inside of the canister with the adsorbent, a flow resistance of the canister is small. Then, by forming the adsorbent into the hollow shape, the thickness of each part is set to be relatively small in comparison with the size of the outside shape, and the proportion of the volume of the macroscopic pore to the volume of the microscopic pore is therefore set to be relatively low. That is, the thickness of each part of the adsorbent and the proportion of the macroscopic pore are combined so as to be an optimal combination. With this setting, the flow resistance which is important as the canister can be kept low, and also both of the adsorbing/desorbing performance and the strength of the adsorbent can be satisfied.

Further, by filling the inside of the canister with the above adsorbent, the canister, having inflow and outflow portions of fuel vapor that are provided at one end, in a flow direction, of the case and an air release opening that is provided at the other end, in the flow direction, of the case, is formed. Especially in the case of the canister of the present invention, an equivalent diameter of a flow passage which is filled with the adsorbent is an equivalent diameter more than seven times the outside diameter or the diameter of the adsorbent.

With this setting, even in a case where the adsorbent is relatively large, a high filling factor can be obtained. Here, with respect to the equivalent diameter, when a flow passage cross section is a circle, the equivalent diameter means a diameter of the circle. When the flow passage cross section is a noncircular shape, the equivalent diameter means a diameter of a circle that has a same cross section area as that of the noncircular shape.

According to the present invention, by setting the size of the outside shape of the adsorbent to be sufficiently large in order to decrease the flow resistance, and also by suppressing the thickness of each part of the adsorbent as the hollow shape and setting the proportion of the macroscopic pore to be relatively low, it is possible to satisfy the adsorbing/desorbing performance of the fuel vapor, the flow resistance as the canister and the strength of the adsorbent at the same time.

BRIEF DESCRIPTION OF THE DRAWINGS

FIG. 7 is a graph showing a relationship between an equivalent diameter of a case and a filling factor.

EMBODIMENTS FOR CARRYING OUT THE INVENTION

Figure 1:
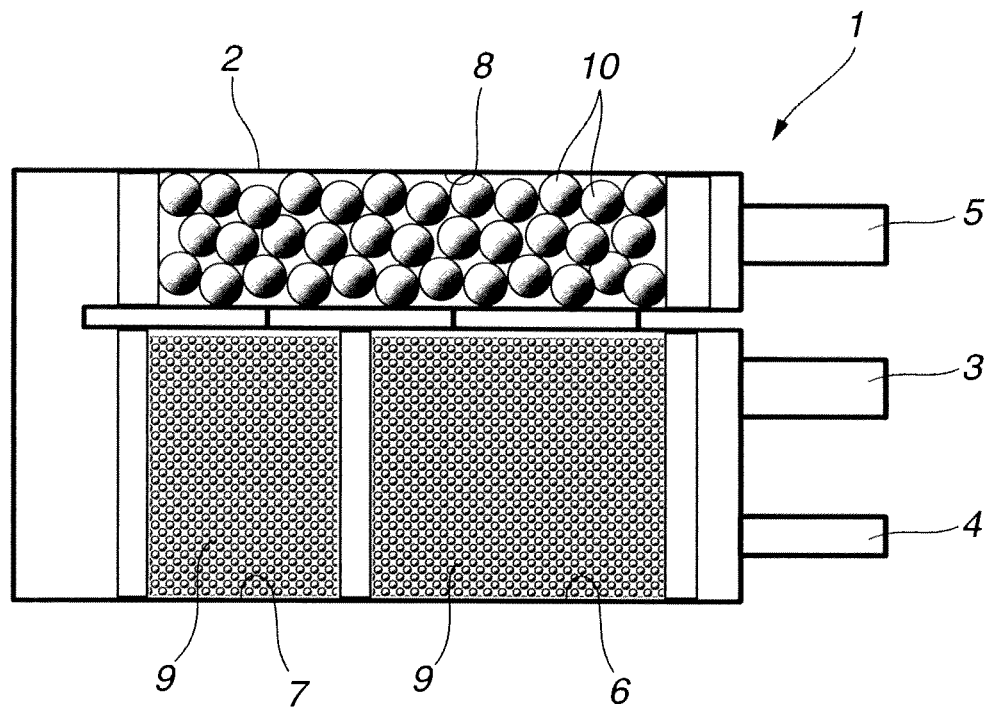
FIG. 1 is a sectional view showing an embodiment of a canister.

FIG. 1 shows an embodiment of a canister 1 according to the present invention. This canister 1 is a canister in which a flow passage is formed into a U-turn shape by a synthetic resin case 2. A charge port 3 that is an inflow portion of fuel vapor and a purge port 4 that is an outflow portion of the fuel vapor are provided at one end, in a flow direction, of the case 2. An air port 5 that is an air release opening is provided at the other end, in the flow direction, of the case 2. The charge port 3 is connected to, for instance, a fuel tank (not shown) of a vehicle, while the purge port 4 is connected to, for instance, an intake system of an internal combustion engine.

In the case 2, as chambers to accommodate therein adsorbent, a first chamber 6, a second chamber 7 and a third chamber 8 are arranged in series in order from a side of the charge port 3 and the purge port 4. The first chamber 6 and the second chamber 7 are each filled with an adsorbent 9 that is formed from molded activated carbon or crushed or pulverized activated carbon which has a relatively small particle diameter. This adsorbent 9 basically has microscopic pore of the activated carbon itself, but does not actively have macroscopic pore by an after-mentioned meltable core.

In contrast to this, the third chamber 8 is filled with an adsorbent 10 which has a large particle diameter, according to the present invention. With this, reduction of a flow resistance especially at a part near or close to the air port 5 in the flow passage of the canister 1 is achieved, then a desorbing performance of the canister 1 as a whole is improved.

The first chamber 6, the second chamber 7 and the third chamber 8 are each divided by, for instance, a porous plate or a filter which is permeable to the air.

The adsorbent 10 is an adsorbent that has the macroscopic pore (a diameter of the pore is equal to or greater than 100 nm and is less than 100000 nm) serving as the path of the fuel vapor, in addition to the microscopic pore of the activated carbon itself (a diameter of the pore is equal to or greater than 2 nm and is less than 100 nm). For example, by adding the meltable core, which is a solid at room temperature and vaporizes, sublimates or decomposes at an after-mentioned baking temperature, to powdery activated carbon together with a binder and molding and baking this mixture, the adsorbent 10 having a predetermined large-sized granular shape or particle is obtained.

In the following description, its example will be explained. As the activated carbon, it is powdery activated carbon whose grain size (particle diameter) is 350 μm or less (42 mesh pass) obtained by crushing or pulverizing market-available coal-based or wood-based activated carbon.

As the binder, powder or solid content of sol of powdery bentonite, knot clay, silica sol or alumina sol is used.

As the meltable core, powdery material (preferably, a grain size (a particle diameter) is 0.1 μm~1 mm), which is the solid at the room temperature and vaporizes, sublimates or decomposes at the baking temperature and also is less apt to dissolve in water that is medium at manufacturing, is used. For example, it is subliming organic compound (e.g. naphthalene and para-dichlorobenzene) and polymer (e.g. polyethylene) which has a high melting point and is apt to decompose.

These three of the activated carbon, the binder and the meltable core are mixed in a suitable mixing ratio with water added as necessary. Then, this mixture is molded into a cylindrical shape whose diameter is 4~6 mm and whose length is about 2~12 mm (preferably, the length is substantially same as the diameter) by extrusion. Further, this molded mixture is baked at 650° C.~1000° C. for 3~4 hours under an inert gas atmosphere using a rotary kiln etc., then the granular adsorbent 10 (or the particulate adsorbent 10) is obtained.

Here, as the meltable core and the binder, other material disclosed in the above Patent Document 1 etc. can also be used.

The meltable core disappears (or melts away) during the baking, thereby forming the macroscopic pore (the diameter of the pore is equal to or greater than 100 nm and is less than 100000 nm) serving as the path of the fuel vapor, in addition to the microscopic pore of the activated carbon itself (the diameter of the pore is equal to or greater than 2 nm and is less than 100 nm). That is, the adsorbent 10 obtained has a so-called macroporous structure formed from the macroscopic pore and also has a so-called microporous structure formed from the microscopic pore that catches a molecule of the evaporated fuel.

Although a volume of the microscopic pore which occupies the adsorbent 10 is determined mainly by the activated carbon used, a volume of the macroscopic pore which occupies the adsorbent 10 is controllable by a proportion of the meltable core. Thus, a proportion of the volume of the macroscopic pore to the volume of the microscopic pore in the adsorbent 10 (i.e. the volume of the macroscopic pore/the volume of the microscopic pore) can be adjusted.

In the present invention, this ratio between the two is 65% or more and is 150% or less. As compared with a ratio disclosed in the Patent Document 1, this ratio is a much smaller value. Here, the volume of the macroscopic pore can be measured by, for instance, a method of mercury penetration provided by "ISO 15901-1". The volume of the microscopic pore can be measured by, for instance, a nitrogen gas adsorption method provided by "ISO 15901-2".

Figures 2A, 2B:
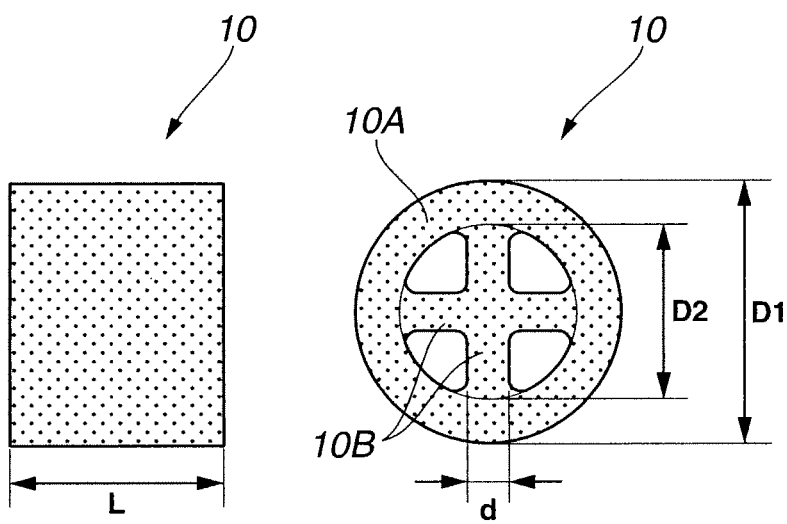
FIGS. 2A and 2B are a side view and a front view of a molded adsorbent.

On the other hand, in one embodiment, the adsorbent 10 has a shape in cross section as shown in FIGS. 2A and 2B. That is, it is a hollow cylindrical shape having a cylindrical wall 10A at an outer side and a cross-shaped radial wall 10B provided in the middle inside the cylindrical wall 10A.

A thickness of each part is within a range from 0.6 mm to 3 mm (0.6 mm or more and 3 mm or less). For instance, an outside diameter D1 of the cylindrical wall 10A is 4.9 mm, and an inside diameter D2 of the cylindrical wall 10A is 3.3 mm.

A thickness d of each part of the radial wall 10B is, for instance, 0.7 mm. A thickness (a thickness in a radial direction) of the cylindrical wall 10A is, for instance, 0.8 mm. Further, a length L in an axial direction is 4 mm. However, with regard to these sizes, variations occurring at an actual cutting process are great.

Here, as the radial wall 10B, besides the cross-shape described above, various shapes such as a radial wall extending in three directions and an I-shaped (l-shaped) wall extending in two directions could be employed.

In view of the flow resistance of the canister 1, a large-sized adsorbent 10 is favorable for suppression of the flow resistance. However, if the thickness (in a case of a simple spherical shape, its diameter corresponds to the thickness) of the adsorbent 10 becomes thicker, the adsorbing/desorbing performance as the adsorbent, especially the desorbing performance, is deteriorated.

Figure 3:
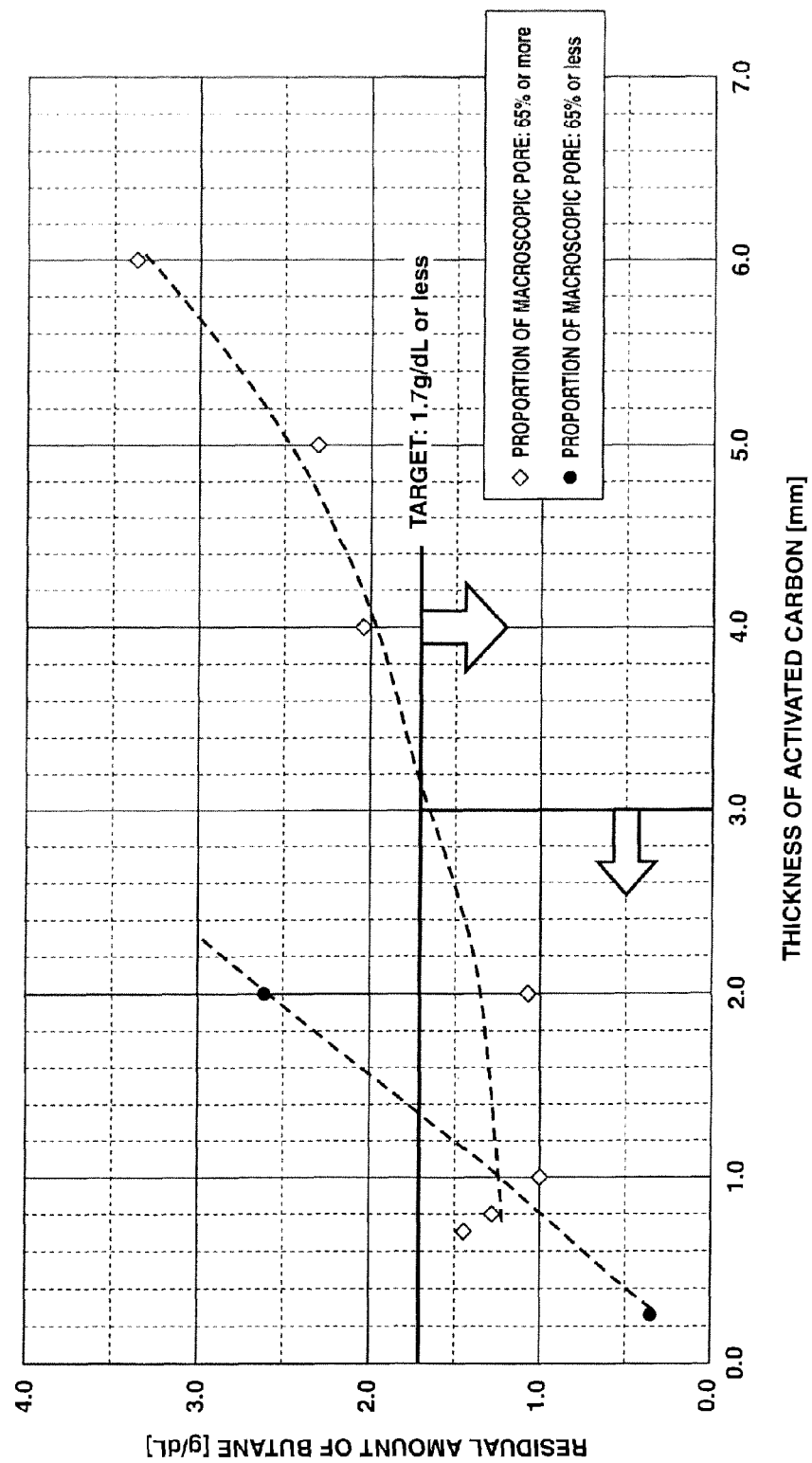
FIG. 3 is a graph showing a relationship between a residual amount of butane upon purging and a thickness of the adsorbent.

A graph of FIG. 3 shows a relationship between a residual amount of butane after purging and a thickness of the activated carbon (the adsorbent) measured by a butane working capacity test method provided by "ASTM D 5228". In a case where a target value of the residual amount of the butane after purging is set to 1.7 g/dL, if the proportion of the macroscopic pore described above is set to 65% or more, it is required that the thickness of the activated carbon (the adsorbent) be 3 mm or less.

Figure 4:
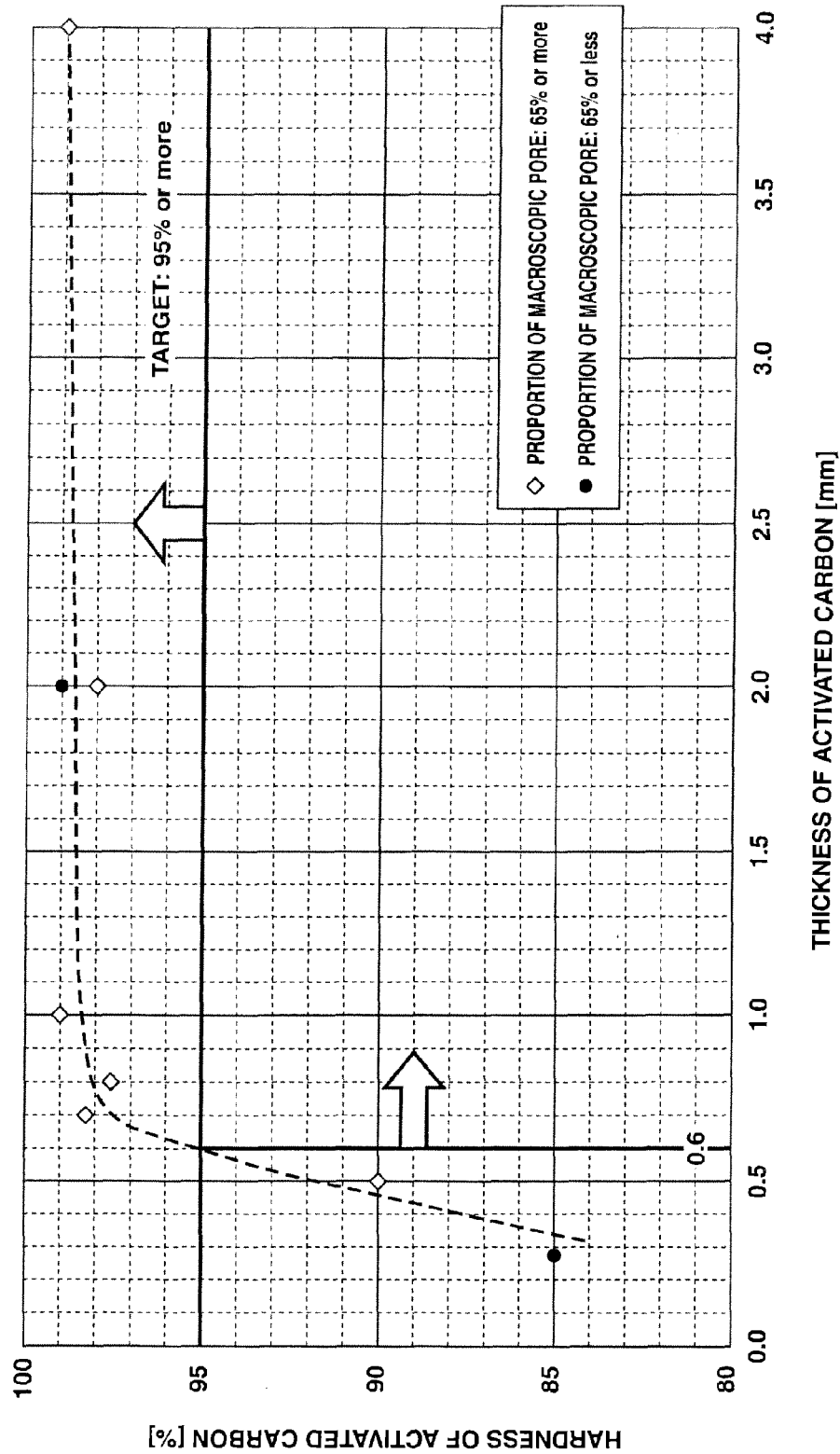
FIG. 4 is a graph showing a relationship between a hardness of the adsorbent and a thickness of the adsorbent.

On the other hand, a graph of FIG. 4 shows a relationship between a hardness (%) of the activated carbon (the adsorbent) and a thickness of the activated carbon (the adsorbent) measured by a strength test method provided by "JIS K1474". When a hardness required as the adsorbent for the canister is 95%, a thickness of 0.6 mm or greater is necessary.

Further, with respect to the proportion of the macroscopic pore, namely (the volume of the macroscopic pore/the volume of the microscopic pore), as great this proportion as possible is favorable for the desorbing performance, but conversely, the strength of the adsorbent decreases.

Figure 5:
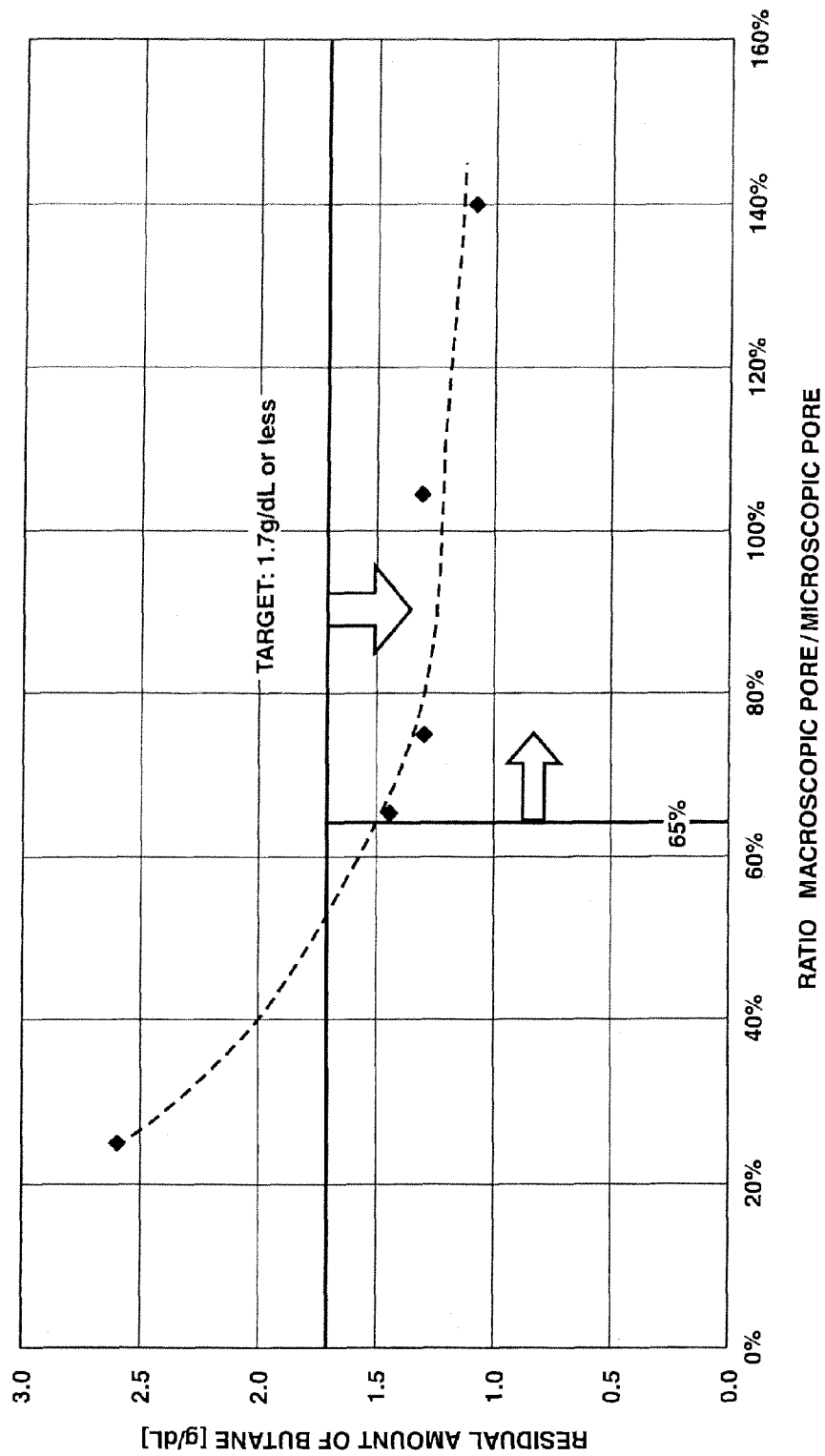
FIG. 5 is a graph showing a relationship between a residual amount of the butane upon purging and a proportion of macroscopic pore.

A graph of FIG. 5 shows a relationship between a residual amount of the butane after purging and a proportion of the macroscopic pore measured by the same butane working capacity test method provided by "ASTM D 5228". Regarding test samples whose adsorbent thicknesses are set to 0.7~2 mm, characteristics as shown in the drawing were obtained. Therefore, if the proportion of the macroscopic pore is set to 65% or more with a margin given, the residual amount of the butane becomes 1.7 g/dL or less which is the target value.

Figure 6:
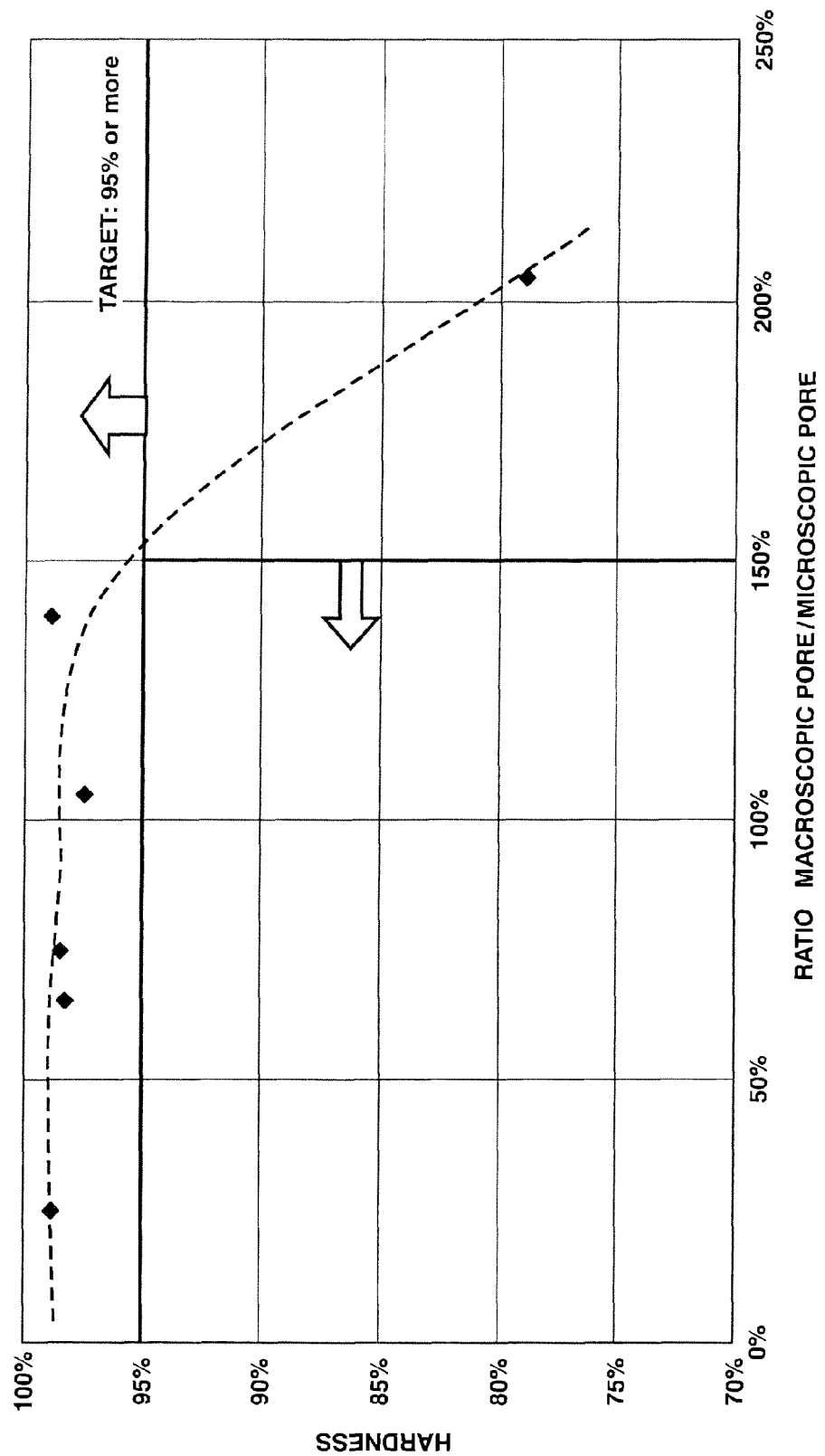
FIG. 6 is a graph showing a relationship between a hardness of the adsorbent and a proportion of the macroscopic pore.

A graph of FIG. 6 shows a relationship between a hardness (%) of the activated carbon (the adsorbent) and a proportion of the macroscopic pore measured by the same strength test method provided by "JIS K1474". As can be seen in the drawing, when the proportion of the macroscopic pore reaches approx. 150%, the hardness sharply decreases. When the required hardness is set to 95%, it is required that the proportion of the macroscopic pore be 150% or less.

Consequently, by setting the proportion of the macroscopic pore to 65%~150% and also the thickness each part of the adsorbent 10 to 0.6 mm~3 mm, both of the desorbing performance and the hardness can be satisfied at a high level.

Embodiment

Each adsorbent of embodiments 1~3 shown in Table 1 is formed by molding and baking the mixture using the above-described powdery activated carbon, binder and meltable core. Each of the adsorbents is formed into the hollow cylindrical shape having the cross-shaped radial wall 10B shown in FIGS. 2A and 2B. Regarding the embodiments 1 and 2, the outside diameter D1 is 4.9 mm, and the thickness of the cylindrical wall 10A, which is the thickest thickness, is 0.8 mm. Regarding the embodiment 3, the outside diameter D1 is 4.6 mm, and the thickness of the cylindrical wall 10A, which is the thickest thickness, is 0.7 mm.

By adjusting an amount of the meltable core that is mixed in the activated carbon, the proportion of the volume of the macroscopic pore to the volume of the microscopic pore is set to be different. In the embodiment 1, this proportion of the macroscopic pore is 105%. In the embodiment 2, it is 75%. In the embodiment 3, it is 65%.

In the embodiments 1~3, as shown in Table 1, the residual amount of the butane of 1.7 g/dL or less which is the target value and the hardness of 95% or more can be obtained.

Specific material compositions of the embodiments 1~3 are as follows.

Embodiment 1: the powdery activated carbon: 53 wt %, the knot clay as the binder: 29 wt %, methylcellulose as the meltable core: 7 wt % and also polyethylene as the meltable core: 11 wt %.

Embodiment 2: the powdery activated carbon: 50 wt %, the knot clay as the binder: 37 wt %, methylcellulose as the meltable core: 13 wt %.

Embodiment 3: the powdery activated carbon: 53 wt %, the knot clay as the binder: 40 wt %, methylcellulose as the meltable core: 7 wt %.

Here, a volume of the microscopic pore in the powdery activated carbon that is raw material is each 0.7 mL/g (which is measured by the nitrogen gas adsorption method provided by "ISO 15901-2"). The baking temperature is each 900° C.

In the same manner, each adsorbent of comparative examples 1~4 is formed with shape, size and a proportion of the meltable core changed. The comparative examples 1 and 3 are formed into a simple cylindrical shape, and the comparative examples 2 and 4 are formed into a spherical shape. The proportions of the macroscopic pore of the comparative examples 1~4 are 25%, 60%, 205% and 140% respectively.

In the comparative example 1, since the proportion of the macroscopic pore is low in comparison with the thickness (a diameter of the cylinder), the strength (the hardness) is sufficient, while the desorbing performance indicated by the residual amount of the butane is insufficient.

In the comparative example 2, since the adsorbent is the microscopic adsorbent whose particle diameter is small, although the desorbing performance is good, the strength (the hardness) is insufficient. Here, in the case of such adsorbent having the small particle diameter, the flow resistance as the canister 1 becomes great, then the desorbing performance of the canister 1 as a whole decreases.

In the comparative example 3, this is an example which has almost the same large-sized cylindrical shape as the embodiments 1~3. Also, this is an example in which the proportion of the macroscopic pore is increased so as to compensate decrease of the adsorbing/desorbing performance which is caused by the fact that the thickness (the diameter of the cylinder) is large. However, even though the proportion of the macroscopic pore is increased as described above, the desorbing performance indicated by the residual amount of the butane is insufficient. Further, since the proportion of the macroscopic pore is high, the strength (the hardness) is also insufficient.

In the comparative example 4, since the particle diameter is 2 mm and the proportion of the macroscopic pore is 140%, which is within an appropriate range, both of the desorbing performance indicated by the residual amount of the butane and the strength (the hardness) reach satisfactory levels. However, in the case of such adsorbent having the relatively small particle diameter, the flow resistance as the canister 1 becomes great, then the desorbing performance of the canister 1 as a whole decreases.

TABLE 1

| | UNIT | EMBODIMENT 1 | EMBODIMENT 2 | EMBODIMENT 3 | COMPARATIVE EXAMPLE 1 | COMPARATIVE EXAMPLE 2 | COMPARATIVE EXAMPLE 3 | COMPARATIVE EXAMPLE 4 | MEASURING METHOD |
|---|---|---|---|---|---|---|---|---|---|
| ADSORBENT SHAPE | — | CYLINDER and CROSS WALL | CYLINDER and CROSS WALL | CYLINDER and CROSS WALL | CYLINDER | SPHERICAL SHAPE | CYLINDER | SPHERICAL SHAPE | |

TABLE 1-continued

| | UNIT | EMBODIMENT 1 | EMBODIMENT 2 | EMBODIMENT 3 | COMPARATIVE EXAMPLE 1 | COMPARATIVE EXAMPLE 2 | COMPARATIVE EXAMPLE 3 | COMPARATIVE EXAMPLE 4 | MEASURING METHOD |
|---|---|---|---|---|---|---|---|---|---|
| ADSORBENT PARTICLE DIAMETER (OUTSIDE DIAMETER) | mm | 4.9 | 4.9 | 4.6 | 2.0 | 0.3 | 4.0 | 2.0 | — |
| ADSORBENT THICKNESS | mm | 0.8 | 0.8 | 0.7 | 2.0 | 0.3 | 4.0 | 2.0 | — |
| VOLUME OF MACROSCOPIC PORE 100-100000 nm | mL/g | 0.48 | 0.33 | 0.29 | 0.24 | 0.15 | 0.76 | 0.74 | MERCURY PENETRATION METHOD ISO 15901 - 1 |
| VOLUME OF MICROSCOPIC PORE 2-100 nm | mL/g | 0.47 | 0.45 | 0.45 | 1.00 | 0.26 | 0.37 | 0.53 | NITROGEN GAS ADSORPTION METHOD ISO 15901 - 2 |
| RATIO MACROSCOPIC PORE/MICROSCOPIC PORE | — | 105% | 75% | 65% | 25% | 60% | 205% | 140% | — |
| HARDNESS | — | 98% | 99% | 98% | 99% | 85% | 79% | 99% | JIS K 1474 |
| RESIDUAL AMOUNT OF BUTANE AFTER ADSORPTION/DESORPTION | g/dL | 1.3 | 1.3 | 1.4 | 2.6 | 0.3 | 2.0 | 1.1 | ASTM D 5228 |

As shown in FIG. 1, the adsorbent 10 formed as described above is used with the adsorbent 10 filling the third chamber 8 of the canister 1 at random. If the particle diameter of the adsorbent 10 is large, since a gap appearing between the adjacent adsorbents 10 becomes large, although the flow resistance decreases, a filling factor of the adsorbent 10 filling the case 2 lowers. Especially when a diameter of the case 2 (the third chamber 8) is small, the filling factor excessively lowers.

A graph of FIG. 7 shows a relationship between an equivalent diameter of the case 2 (the third chamber 8) and the filling factor in a case where the cylindrical adsorbent 10 whose diameter is 4 mm is used. In order to obtain a filling factor of 94% or more with a filling factor of a case where the equivalent diameter is sufficiently large being 100%, an equivalent diameter more than seven times the diameter of the adsorbent 10 (in this example, 28 mm or more) is necessary.

Regarding the diameter of the cylindrical adsorbent 10, as explained above, 4~6 mm is preferable. In a case where, as the case 2 (the third chamber 8) of the canister 1, a space of a diameter 42 mm×a length 100 mm is set and this space is filled with the adsorbent 10, when a target value of the flow resistance when flowing the air at a flow rate of 50 L/min is set to 1 kPa or less, if the adsorbent 10 has a diameter of 4 mm or more, the flow resistance is 1 kPa or less.

On the other hand, in order to secure the filling factor of 94% or more as described above, in the case of the case 2 having the diameter 42 mm, it is required that the diameter be set to 6 mm or less.

Here, with respect to these characteristics, also in the case of the adsorbent having the spherical shape, the same characteristics are obtained. In the case of the spherical adsorbent whose diameter is 4~6 mm, it is desirable that an equivalent diameter of the flow passage of the canister 1 should be an equivalent diameter more than seven times the diameter of the adsorbent.

The invention claimed is:

1. Adsorbent for a canister, the adsorbent forming macroscopic pore whose size is 100 nm or more by adding meltable core, which melts away during baking, to powdery activated carbon having microscopic pore whose size is less than 100 nm together with a binder and baking this mixture, the adsorbent comprising:
   a hollow shape having, as an outside shape, a cylindrical shape whose outside diameter is 4 mm~6 mm or a spherical shape whose diameter is 4 mm~6 mm, also having a thickness of 0.6 mm~3 mm at each part, and
   a proportion of a volume of the macroscopic pore to a volume of the microscopic pore in the adsorbent being set to 65%~150%.

2. The adsorbent for the canister as claimed in claim 1, wherein:
   the adsorbent has a hollow shape in cross section, which is formed from a cylindrical wall at an outer side and a radial wall provided in a middle inside the cylindrical wall, and
   a thickness of each part of the cylindrical wall and the radial wall is within a range of 0.6 mm~3 mm.

3. The adsorbent for the canister as claimed in claim 2, wherein:
   the thickness of each part of the cylindrical wall and the radial wall is within a range of 0.7 mm~0.8 mm.

4. The adsorbent for the canister as claimed in claim 2, wherein:
   the adsorbent has a cylindrical shape whose outside diameter is 4 mm~6 mm and whose length is 2 mm~12 mm.

5. The adsorbent for the canister as claimed in claim 2, wherein:
   the radial wall has a cross shape in cross section.

6. The adsorbent for the canister as claimed in claim 2, wherein:
   the radial wall extends radially in three directions from a center.

7. The adsorbent for the canister as claimed in claim 2, wherein:
the radial wall has an I-shape in cross section which extends in two directions from a center.

8. The adsorbent for the canister as claimed in claim 1, wherein:
in the canister that has a plurality of chambers in a flow direction, the adsorbent is used in a chamber that is nearest to an air release opening.

9. A canister whose case is filled with the adsorbent claimed in claim 1, comprising:
inflow and outflow portions of fuel vapor that are provided at one end, in a flow direction, of the case; and
an air release opening that is provided at the other end, in the flow direction, of the case, and
an equivalent diameter of a flow passage which is filled with the adsorbent being an equivalent diameter more than seven times the outside diameter or the diameter of the adsorbent.

10. The canister as claimed in claim 9, wherein:
the canister is provided with a plurality of chambers in the flow direction,
at least a chamber that is nearest to the air release opening is filled with the adsorbent, and
other chamber is filled with adsorbent that is formed from activated carbon having no macroscopic pore by the meltable core.

\* \* \* \* \*